United States Patent
Simons

(10) Patent No.: US 9,919,677 B2
(45) Date of Patent: Mar. 20, 2018

(54) INTEGRATED CIRCUIT DEVICE AND METHOD FOR DUAL-MODE TRANSPONDER COMMUNICATION PROTOCOL

(71) Applicant: NXP B.V.

(72) Inventor: Sven Simons, Graz (AT)

(73) Assignee: NXP B.V., Eindhoven (NL)

( * ) Notice: Subject to any disclaimer, the term of this patent is extended or adjusted under 35 U.S.C. 154(b) by 272 days.

(21) Appl. No.: 14/958,515

(22) Filed: Dec. 3, 2015

(65) Prior Publication Data

US 2017/0158165 A1  Jun. 8, 2017

(51) Int. Cl.
*B60R 25/021*  (2013.01)

(52) U.S. Cl.
CPC ............... *B60R 25/02105* (2013.01)

(58) Field of Classification Search
CPC ............ B60R 25/02105; G07C 9/00182
See application file for complete search history.

(56) References Cited

U.S. PATENT DOCUMENTS

| | | | | |
|---|---|---|---|---|
| 5,587,712 A * | 12/1996 | Boone | ............ | G06K 7/0008 342/42 |
| 7,710,213 B2 * | 5/2010 | Berhorst | ............ | G06K 19/0701 331/75 |
| 8,737,947 B2 * | 5/2014 | Sbuell | ............ | H04B 5/0012 455/343.1 |
| 2006/0187015 A1 * | 8/2006 | Canfield | ............ | H04B 3/548 340/474 |
| 2006/0238301 A1 * | 10/2006 | Wu | ............ | G06K 7/0008 340/10.1 |
| 2008/0296978 A1 * | 12/2008 | Finkenzeller | ........ | G06K 7/0008 307/104 |
| 2009/0027169 A1 * | 1/2009 | Kondo | ............ | G06K 7/0008 340/10.2 |
| 2009/0212916 A1 * | 8/2009 | Ganz | ............ | G06K 19/0723 340/10.1 |
| 2009/0322483 A1 * | 12/2009 | Witschnig | ............ | G06K 7/10297 340/10.1 |
| 2016/0275736 A1 * | 9/2016 | Sass | ............ | G07C 9/00126 |

* cited by examiner

*Primary Examiner* — Thienvu Tran
*Assistant Examiner* — Pinping Sun
(74) *Attorney, Agent, or Firm* — Rajeev Madnawat

(57) ABSTRACT

A transponder is disclosed. The transponder includes a resonant circuit serving as an antenna, a load modulation module coupled to the resonant circuit, a current source coupled to the resonant circuit and a command interpreter configured to interpret a received initialization command. The command interpreter is configured to monitor input communication for a stop command signal and a charge & talk bit and if the charge & talk bit is not received within a predetermined time interval after receiving the stop command signal, the load modulation module is activated to provide a signal for transmission by modifying an incoming carrier wave through the load modulation module. If the charge & talk bit is received within the predetermined time after receiving the stop command signal, the current source is activated to provide a signal for transmission by generating pulses of current.

17 Claims, 9 Drawing Sheets

INTEGRATED CIRCUIT DEVICE AND METHOD FOR DUAL-MODE TRANSPONDER COMMUNICATION PROTOCOL

RELATED APPLICATIONS

This application is related to application Ser. No. 14/879,985 filed on Oct. 9, 2015 entitled "An Integrated Circuit Device and Method for Dual-Mode Transponder Communication."

BACKGROUND

Many countries require new vehicles to include an immobilizer device in ignition circuitry of the vehicles. An immobilizer is a security system, typically made up of an immobilizer base station and a transponder in a key. The immobilizer base station is typically located in the steering column or in the dashboard of a vehicle and is able to prevent fuel flow or ignition of the vehicle (i.e., by breaking an electrical circuit or otherwise disabling signal flow within the circuitry of the vehicle) when the key is not present. Properly configured, an immobilizer can greatly reduce the possibility of vehicle theft because standard hotwiring methods are ineffective.

A transponder may be a legacy transponder using load modulation (LM) communication method. A LM type transponder offers limited range. New type of transponders use charge & talk (C&T) communication method and offer extended range of communication. A transponder designed to work with C&T base station is not able to communication with legacy LM base stations and vice versa.

SUMMARY

In one embodiment, an integrated circuit (IC) device disclosed. The IC device includes a load modulation module, a current source coupled to the load modulation module and an interface to a resonant circuit. The interface is coupled to the load modulation module and to the current source. The IC device also includes an interface to a charge source. The interface coupled to the current source. The IC device is configured to monitor input communication for a stop command signal and a charge & talk bit and if the charge & talk bit is not received within a predetermined time interval after receiving the stop command signal, the load modulation module is activated to provide a signal for transmission by modifying an incoming carrier wave through the load modulation module. If the charge & talk bit is received within the predetermined time interval after receiving the stop command signal, the current source is activated to provide a signal for transmission by generating pulses of current.

In some embodiments, prior to activating the current source to provide a signal for transmission, the IC device is configured to wait for the charge & talk bit in the input communication. The IC is configured to receive charge & talk configuration data after receiving the charge & talk bit. In one example, the IC device further comprises a command interpreter configured to interpret a received initialization command, enable the current source and disable the load modulation, and disable the current source and enable the load modulation module according to a mode indicated by the initialization command.

In another embodiment, a transponder is disclosed. The transponder includes a resonant circuit serving as an antenna, a load modulation module coupled to the resonant circuit, a current source coupled to the resonant circuit and a command interpreter configured to interpret a received initialization command. The command interpreter is configured to monitor input communication for a stop command signal and a charge & talk bit and if the charge & talk bit is not received within a predetermined time interval after receiving the stop command signal, the load modulation module is activated to provide a signal for transmission by modifying input carrier wave through the load modulation module, and if the charge & talk bit is received within a predetermined time interval after receiving the stop command signal, the current source is activated to provide a signal for transmission by generating pulses of current.

The transponder comprises a plurality of antennas. The plurality of antennas are arranged in an orthogonal pattern, wherein an antenna with strongest signal is used for transmission. In one example, prior to activating the current source to provide a signal for transmission, the command interpreter is configured to wait for the charge & talk bit in the input communication. The transponder further configured to receive charge & talk configuration data after receiving the charge & talk bit and configure the resonance circuit according to the charge & talk configuration data.

In one example, the command interpreter is implemented with a microcontroller, the microcontroller including a demodulator configured to receive a serial bitstream and convert the bitstream into at least one of a byte or a word.

In yet another embodiment, a method for communicating with a base station is disclosed. The method includes receiving a command stop bit from the base station and waiting for a predefined period of time for a signal bit after receiving the command stop bit. If the signal bit is not received within the predefined time, preparing to respond in load modulation mode and if the signal bit is received, preparing to respond in charge & talk mode.

In some examples, prior to preparing to respond in charge & talk mode, the method includes receiving charge & talk configuration data from the base station. The charge & talk configuration data includes a charging time for a capacitor that needs to be charged for a duration equal to the received charging time in order to provide energy for the charge & talk mode. The charge & talk configuration data includes a signal level for sending a response to the base station. The charge & talk configuration data may also include a bit to enforce the charge & talk mode. Further, the charge & talk configuration data may also include a type of digital modulation to be used to communicate with the base station.

Other aspects and advantages of embodiments of the present invention will become apparent from the following detailed description taken in conjunction with the accompanying drawings.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
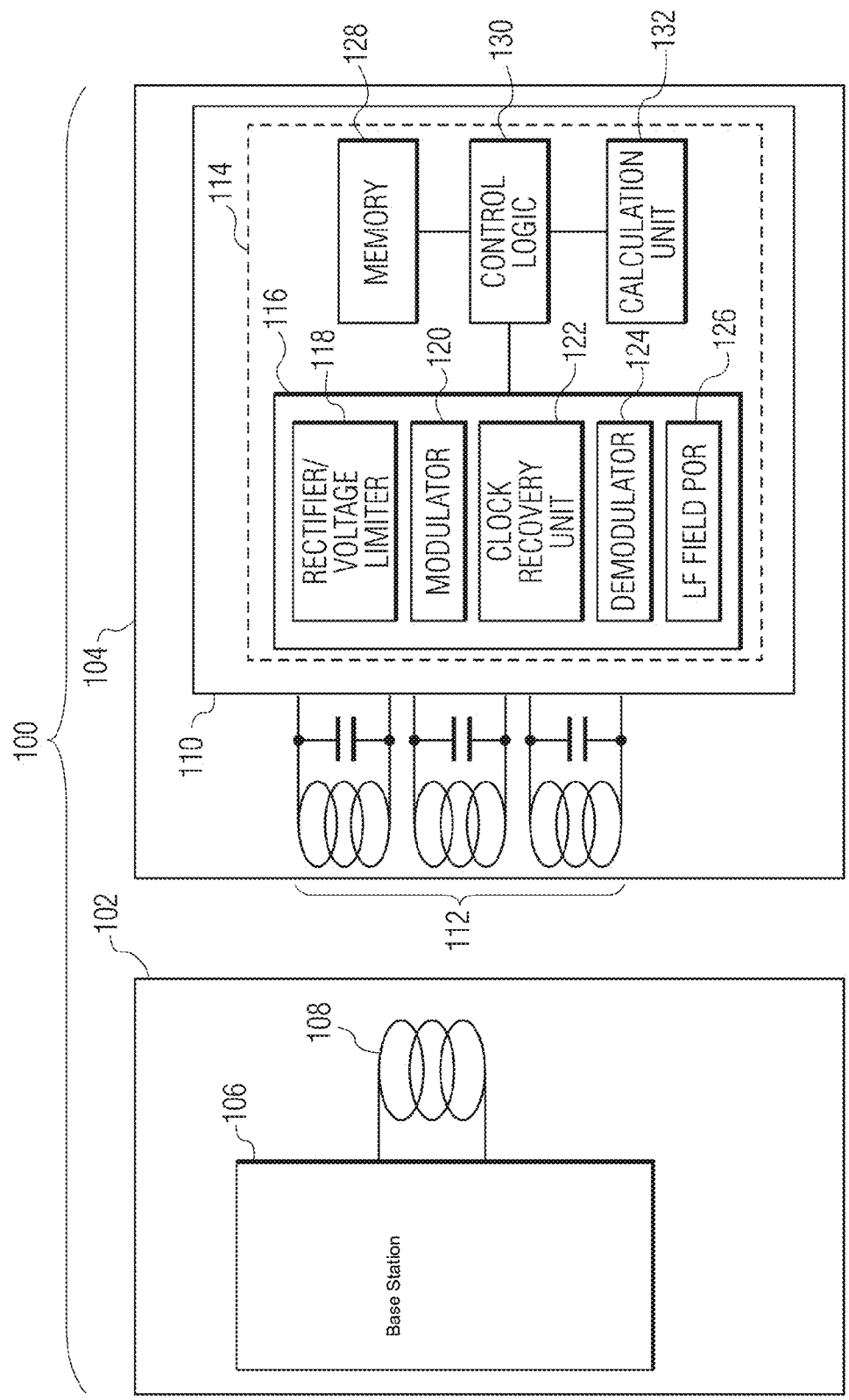
FIG. 1 depicts a typical immobilizer system.

FIG. 1 depicts a typical immobilizer system 100, which is a two-part system having a base station 102 (typically located in the steering column or in the dashboard of a vehicle) and a transponder 104 (typically located in a key fob). In an embodiment, the base station is configured with a single antenna 108 that is used to both transfer energy and data in a write direction and to receive data in a read direction. The single antenna is connected to a base station circuit 106. Elements of the base station are well known in the field and not described further herein. In an embodiment, the transponder has an array of antennas 112 (e.g., three antennas) connected to a transponder circuit 110. The core components 114 of the transponder circuit include memory 128, control logic 130, a calculation unit 132, as well as an RF front end 116 that includes a rectifier/voltage limiter 118, a modulator 120, a clock recovery unit 122, a demodulator 124, and a low-frequency field power-on reset (LF Field POR) 126. In an embodiment, the array of antennas are arranged in an orthogonal pattern such that the transponder can pick up a magnetic field in multiple orientations. The rectifier/voltage limiter insures that proper voltage and current are delivered to the transponder, the modulator converts data from the memory to an analog signal for transmission by the antennas, and the demodulator converts analog signals to digital signals for processing by the control logic and calculation unit. The clock recovery unit approximates and phase-aligns data received via the antennas when data is sent without an accompanying clock signal, and the LF Field POR places the transponder in a desired state (e.g., the configuration of counters, registers, memory, or other circuits in the transponder) when a magnetic field of the base station is detected.

Figure 2:
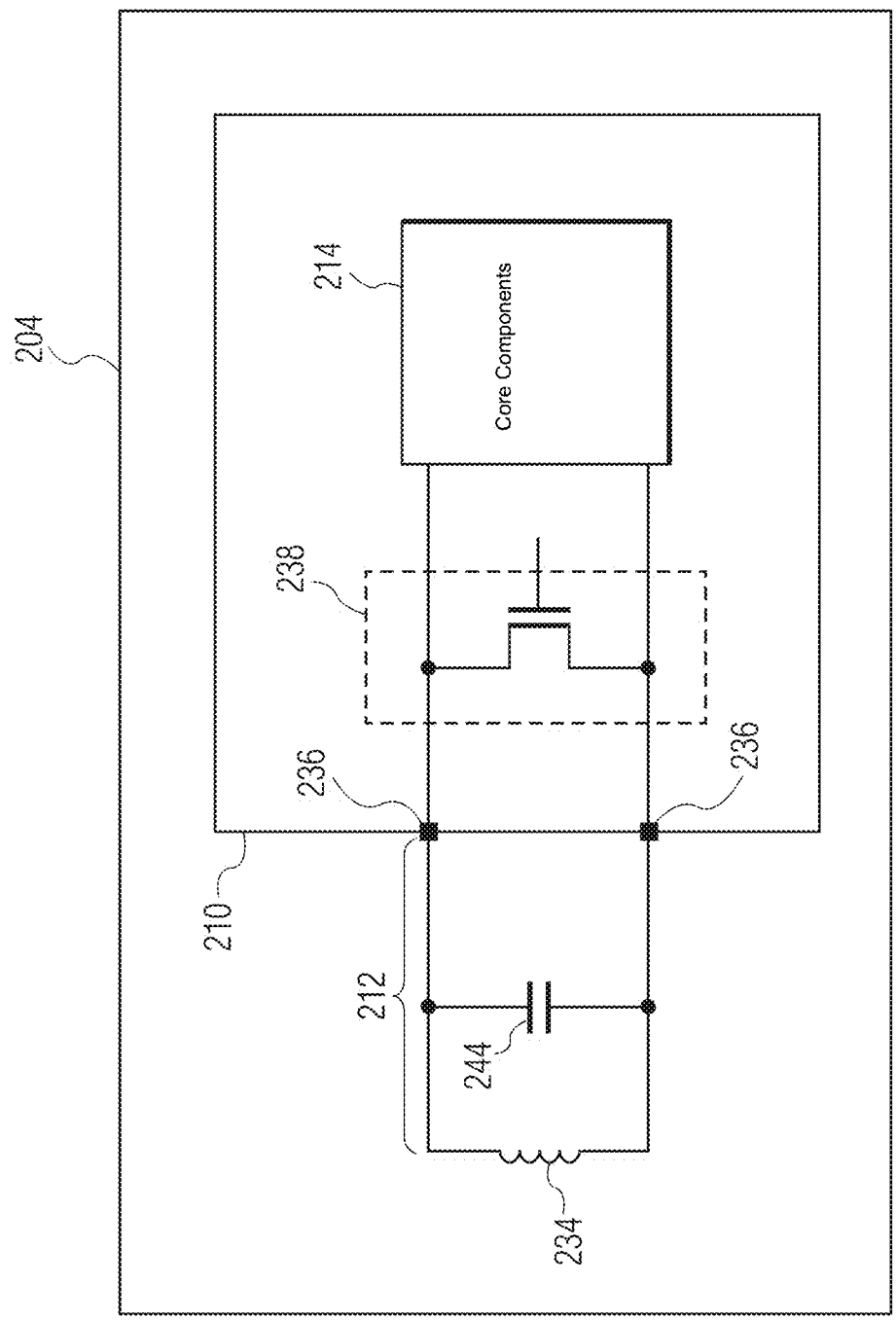
FIG. 2 is a circuit diagram of a transponder configured to use load modulation.

Typically, a transponder is configured for a transmission mode utilizing either load modulation or active transmission, but not both since different circuitry and protocols or at least different protocol timings are required for each transmission mode. For example, FIG. 2 is a circuit diagram of a transponder 204 (similar to transponder 104 in FIG. 1) that is configured to utilize load modulation to communicate with a base station. In the example of FIG. 2, the transponder includes a resonant circuit 212 connected to a transponder circuit 210, the resonant circuit serving as an antenna. In an embodiment, the resonant circuit is an L-C circuit including an inductive coil 234 and a capacitor 244, and the transponder circuit is an integrated circuit (IC) device fabricated on a single substrate (e.g., a single IC die) to which the resonant circuit connects at pins 236. In other embodiments, the transponder circuit may be a single packaged device that includes more than one IC die. The antenna can be external to the transponder circuit (as shown) or internal to the transponder circuit. In addition to the core components 214 of the transponder circuit 210, the transponder circuit further includes a load modulation module 238. In an embodiment, the load modulation module includes a switch and resistors (not shown) in series such that the switch can be opened and closed to change the resistance of the antenna. In operation, a base station generates a magnetic field that interacts with the antenna and the resistance of the antenna can be modulated (e.g., the switch can be closed to increase the load or opened to decrease the load) to transmit data back to the base station.

Figure 3:
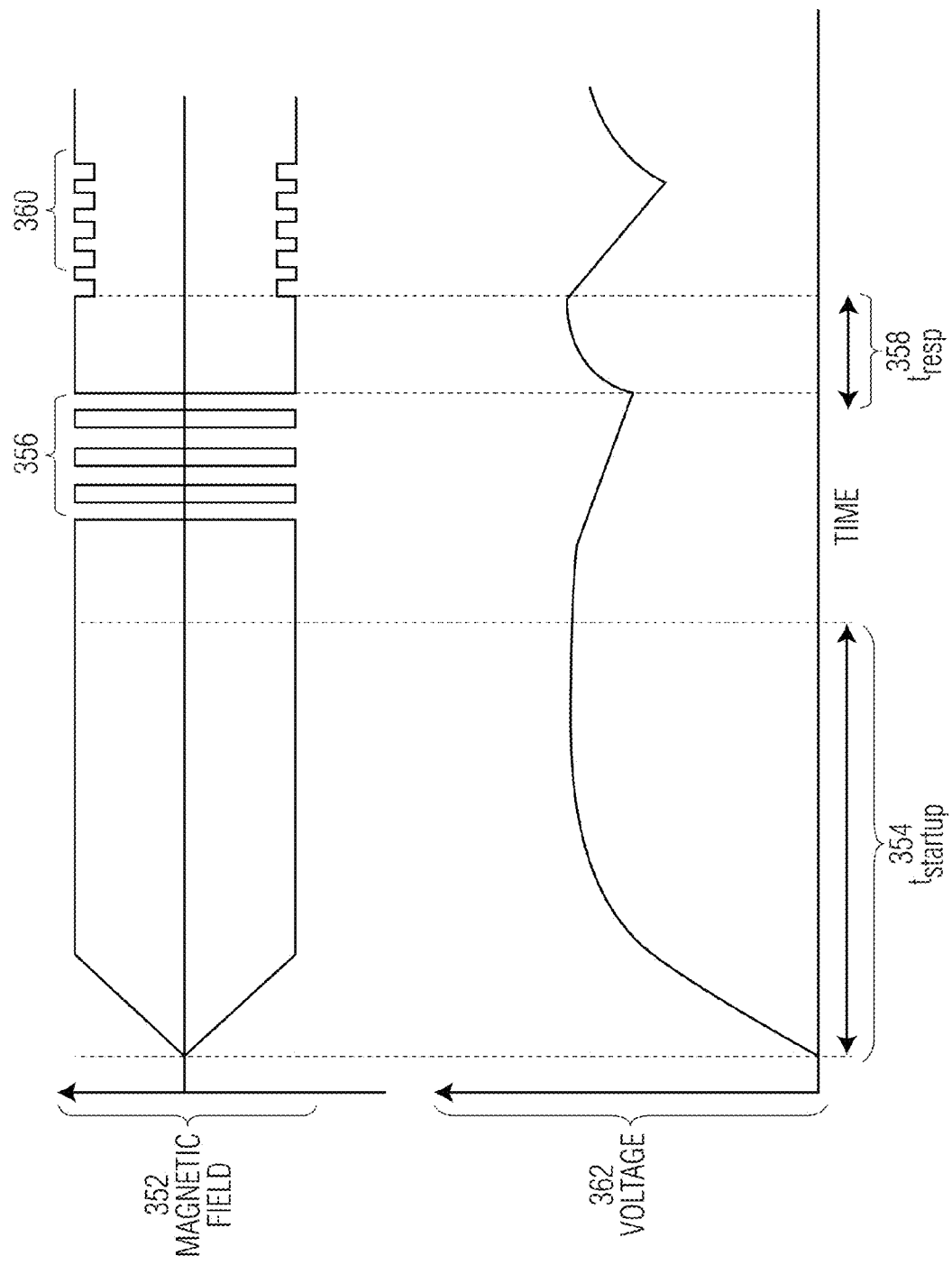
FIG. 3 illustrates a timeline of the load modulation protocol that is followed by an immobilizer system.

In order to receive and transmit data, a transponder configured to utilize load modulation, such as the transponder 204 of FIG. 2, follows a load modulation protocol. FIG. 3 illustrates a timeline of the load modulation protocol that is followed by an immobilizer system. The upper portion 352 of the timeline indicates that a base station is generating a magnetic field for the duration of data transfer between the base station and the transponder and the lower portion 362 of the timeline indicates the voltage within the transponder. After a startup time ($t_{startup}$) 354, the transponder is ready to receive a command 356 from the base station. In an embodiment, the command indicates how the transponder should configure response data and, optionally if the transponder is not already configured, indicates that the transponder should use load modulation to transmit response data. Once the last bit of the command is transmitted, the base station turns on a receiver after a delay ($t_{resp}$) 358 and the transponder starts transmission of the configured response data using load modulation, which creates variance 360 in the magnetic field generated by the base station. In an embodiment, the process is repeated for each communication between the base station and the transponder.

Figure 4:
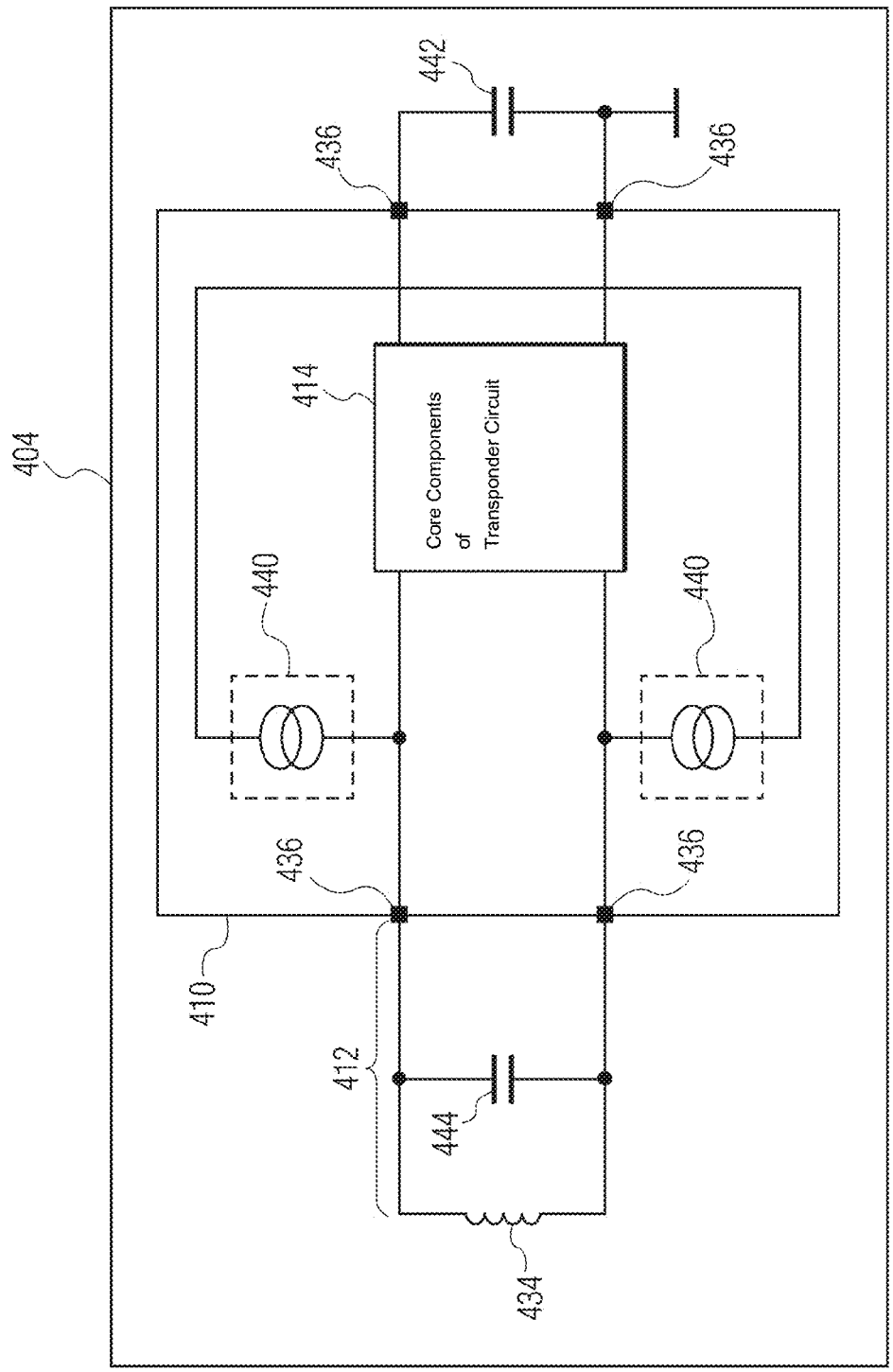
FIG. 4 is a circuit diagram of a transponder configured to use active transmission.

Alternatively, active transmission can be used to transmit data. FIG. 4 is a circuit diagram of a transponder 404 (similar to the transponder 104 in FIG. 1) that is configured to use active transmission. In the example of FIG. 4, the transponder includes a resonant circuit 412 connected to a transponder circuit 410, the resonant circuit serving as an antenna. In an embodiment, the resonant circuit is an L-C circuit including an inductive coil 434 and a capacitor 444, and the transponder circuit is an integrated circuit (IC) device fabricated on a single substrate (e.g., a single IC die) to which the resonant circuit connects at pins 436. In other embodiments, the transponder circuit may be a single packaged device that includes more than one IC die. In an embodiment, the antenna could be external to the transponder circuit (as shown), but could be internal to the transponder circuit in other embodiments. In addition to core components 414 of the transponder circuit, the transponder further includes two current sources 440. A capacitor 442, which is external to the transponder circuit is connected via additional pins 436, but, alternatively, could be internal to the transponder circuit without the use of the additional pins. The capacitor can be a single large capacitor or two or more smaller capacitors connected selectively via pins as needed (e.g., when the transponder will be using active transmission). In operation, a base station generates a magnetic field that interacts with the antenna and the capacitor 442 is charged from the magnetic field. Then, in order to transmit data back to the base station, a rectifier/voltage limiter (e.g., which is included in the core components 414) is configured to convert charge stored in the capacitor as needed by the current sources to transmit data back to the base station.

Figure 5:
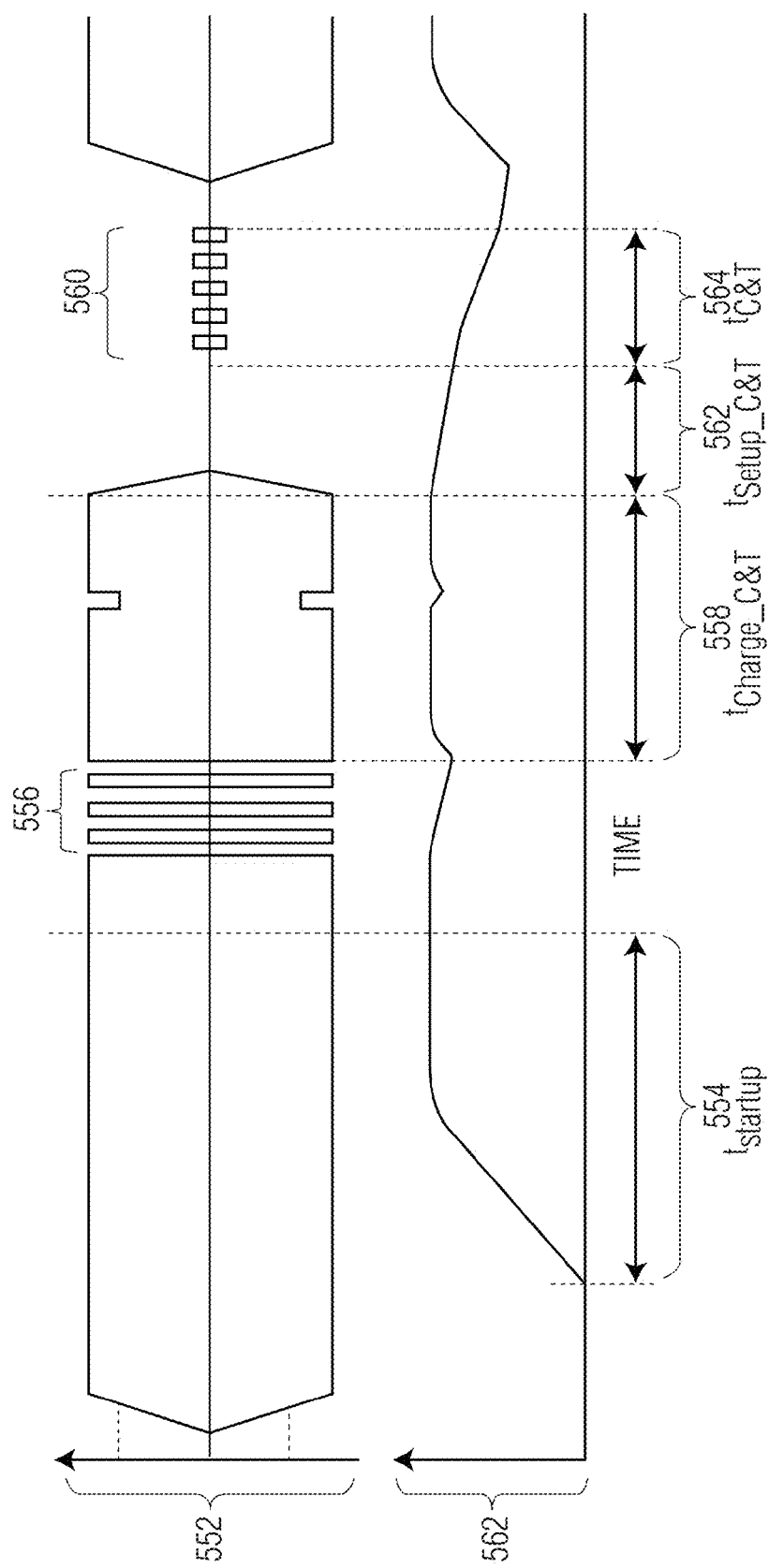
FIG. 5 illustrates a timeline of the active transmission protocol that is followed by an immobilizer system.

In order to receive and transmit data, a transponder configured to utilize active transmission, such as the transponder 404 shown in FIG. 4, follows an active transmission protocol. FIG. 5 illustrates a timeline of the active transmission protocol that is followed by an immobilizer system. The upper portion 552 of the timeline indicates the presence of a magnetic field (e.g., created by the base station or by the transponder) and the lower portion 562 of the timeline indicates the voltage within the transponder. After a startup time ($t_{startup}$) 554, the transponder is ready to receive a command 556 from the base station. In an embodiment, the command indicates how the transponder should configure response data and, optionally if the transponder is not already configured, indicates that the transponder should use active transmission to transmit response data. After the last bit of the command has been transmitted, the base station continues to generate a magnetic field for a period of time ($t_{Charge\_C\&T}$) 558 to allow a capacitor (e.g., the capacitor 442 in FIG. 4) in the transponder to charge, while the transponder determines which antenna (if there are multiple antennas attached) has the strongest channel. Once the capacitor is charged, the base station terminates the magnetic field and transmission is initialized ($t_{setup\_C\&T}$) 562. Data is then transmitted to the base station by the transponder by creating pulses of magnetic field 560 during a transmission period ($t_{C\&T}$) 564 using the charge stored in the capacitor. In an embodiment, the process is repeated for each communication between the base station and the transponder.

Legacy immobilizer systems have typically utilized load modulation, but some immobilizer systems are transitioning to the use of active transmission in order to increase the communication distance. While load modulation is typically more robust than active transmission (i.e., due to the larger signal used with load modulation), active transmission is often favored for its greater signal range. However, conventional transponders are configured to support load modulation or active transmission, but not both simultaneously because different circuitry is required for each transmission mode (as shown in FIGS. 2 and 4). In order to continue to support maintenance of immobilizer systems, service centers may require new equipment, such as diagnostic tools or key replication devices, in order to interface with immobilizer systems using the active transmission protocol. The need for new equipment to support active transmission in addition to the upkeep of legacy equipment to support load modulation can be costly. Thus, automobile manufacturers and service companies often choose to support load modulation or active transmission, but not both.

In an embodiment, an integrated circuit (IC) device is disclosed. In the embodiment, the IC device includes a load modulation module, a current source coupled to the load modulation module, an interface to a resonant circuit, the interface coupled to the load modulation module and the current source, and an interface to a charge source, the interface coupled to the current source, wherein the load modulation module is configured to provide a signal for transmission by modifying the load through the load modulation module, and wherein the current source is configured to provide a signal for transmission by generating pulses of current. Such an IC device can be used to produce a vehicle key that supports both load modulation and active transmission. Accordingly, even if a vehicle supports an immobilization system using active transmission between a transponder in the key and a base station in the steering column, a service center can perform maintenance on the vehicle using active transmission equipment as well as legacy load modulation equipment because the transponder supports both transmission modes.

Figure 6:
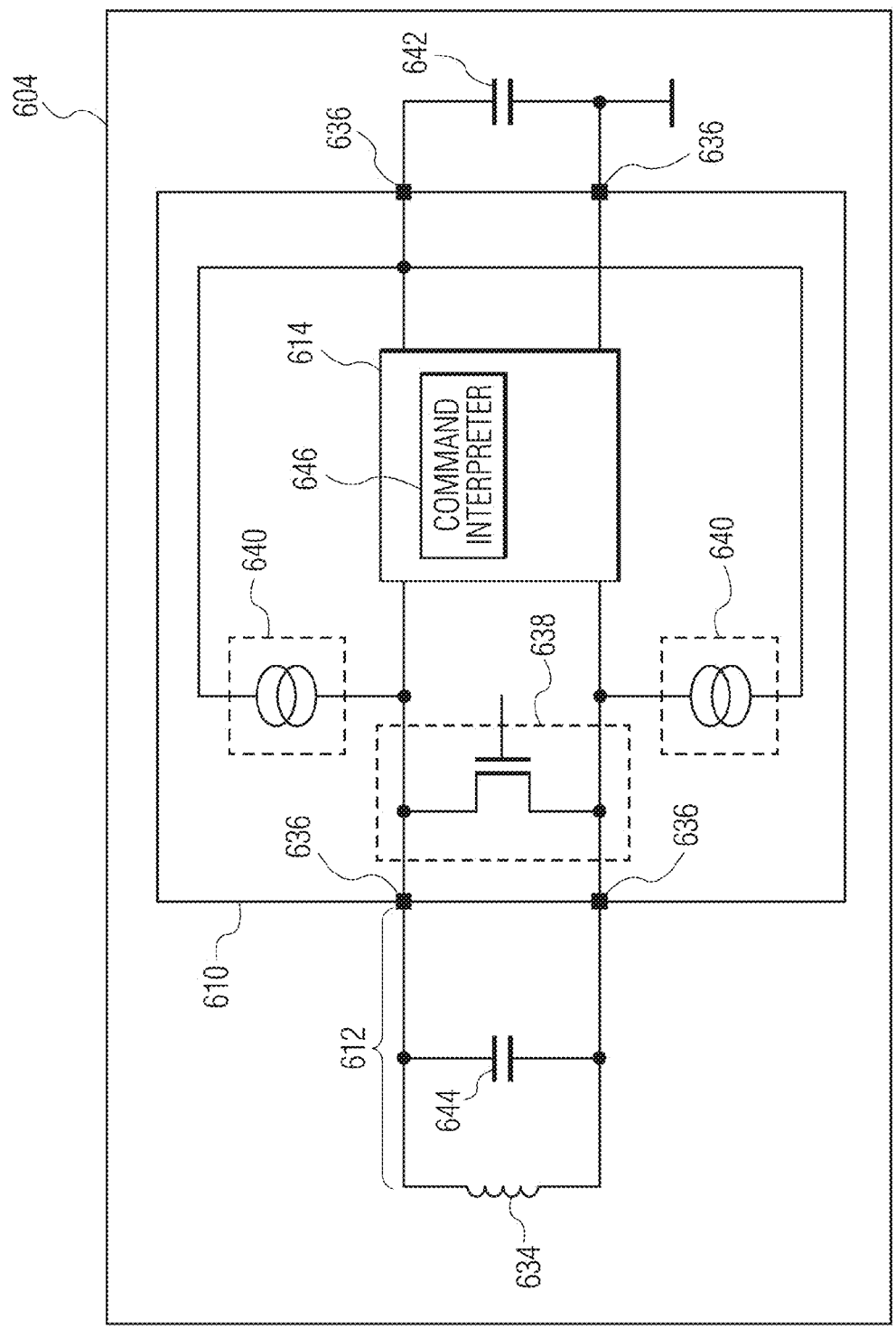
FIG. 6 depicts a circuit diagram of a transponder configured in accordance with an embodiment of the disclosure.

In order to support both load modulation and active transmission, the circuitry of a transponder includes the features of a load modulation transponder (i.e., as described with reference to FIG. 2) and the features of an active transmission transponder (i.e., as described with reference to FIG. 4). FIG. 6 depicts a circuit diagram of a transponder 604 configured in accordance with one or more embodiments described herein. In an embodiment, the transponder 604 includes a resonant circuit 612 connected to a transponder circuit 610, the resonant circuit serving as one (or more) antenna. In an embodiment, the resonant circuit is an L-C circuit including an inductive coil 634 and a capacitor 644, and the transponder circuit is an integrated circuit (IC) device fabricated on a single substrate (i.e., a single IC die) to which the resonant circuit connects at pins 636. In other embodiments, the transponder circuit may be a single packaged device that includes more than one IC die. In an embodiment, the one or more antennas can be external to the transponder circuit (as shown), but can be internal in other embodiments. The transponder circuit includes core components 614 of a transponder circuit, such as the core components 114 described in reference to FIG. 1. The transponder circuit further includes a load modulation module 638 and one or more current sources 640 (two shown) that can be connected to any of the one or more antennas. The current sources are further coupled to a capacitor 642. The capacitor can be external to the transponder circuit and connected to the transponder circuit at pins 636 (as illustrated in FIG. 6), but can also be internal to the transponder circuit. In an embodiment, the current sources can be connected to a node that is subsequently connected to the capacitor rather than being directly connected to the capacitor. In an embodiment, the core components of the transponder circuit further comprise a command interpreter 646 configured to interpret a received initialization command and to enable the current source and disable the load modulation module according to a mode indicated by the initialization command. In an embodiment, the command interpreter can be implemented with a microcontroller, the microcontroller including a demodulator configured to receive a serial bitstream and convert the bitstream into a form more suited for processing by the microcontroller (e.g., a byte or a word). In an embodiment, the microcontroller can include software or further hardware configured to process the converted bitstream using a state machine to check for valid or invalid commands. In operation, the transponder will utilize either the load modulation module to transmit data using load modulation or utilize the current sources to transmit data using active transmission, but not both at the same time. Depending on how the transponder transmits data, either the load modulation protocol (as described with reference to FIG. 3) or the active transmission protocol (as described with reference to FIG. 5) will be followed accordingly. Thus, a single transponder can support load modulation and active transmission, which allows for equipment using load modulation to interface with modern immobilizer systems and, thus, service centers do not need to have new equipment on site to service the modern immobilizer systems. Additionally, so configured, the circuitry provides the novel benefit of reducing interfere in the performance of load modulation or active transmission because the current sources are only active when active transmission is being performed and the load modulator is disabled when active transmission is being performed.

Figure 7:
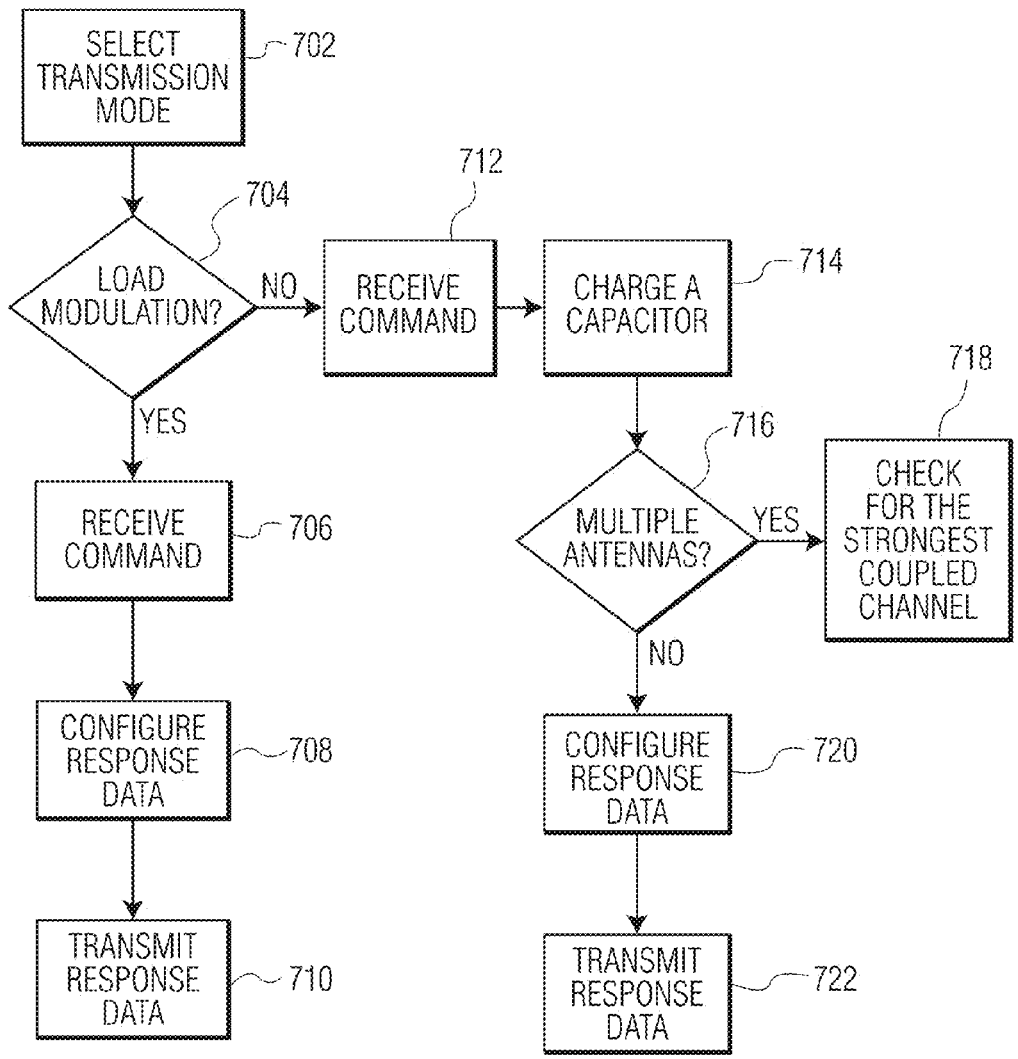
FIG. 7 is a process flow diagram of a method for configuring and communicating data via a transponder in accordance with an embodiment of the disclosure.

Because both load modulation and active transmission are supported in a single transponder, the transponder can be configured to determine whether to utilize load modulation or active transmission to communicate with a base station when initializing communication with the base station. FIG. 7 is a process flow diagram of a method for configuring and communicating data via a transponder in accordance with an embodiment of the invention. At block 702, the transponder selects a single transmission mode (e.g., selects either load modulation or active transmission, but not both). In an embodiment, the transponder selects a transmission mode based on a command received (e.g., an initialization command) from the base station that identifies the transmission mode with which the base station can interface. In another embodiment, the initial transmission mode is pre-configured. At decision point 704, if the load modulation transmission mode is selected, then, at block 706, the transponder receives a command. In an embodiment, the command is sent by the base station and indicates how response data should be configured. At block 708, the transponder configures the response data (in accordance with the manner indicated at block 706) and, at block 710, the transponder transmits the response data back to the base station using load modulation.

If, at decision point 704, the load modulation transmission mode is not selected and the active transmission mode is selected instead, then, at block 712, the transponder receives a command. In an embodiment, the command is sent by the base station and indicates how response data should be configured. At block 714, a capacitor begins charging. In an embodiment, the capacitor is the capacitor 642, as shown in FIG. 6, which is charged using the magnetic field of the base station. While the capacitor is charging, at decision point 716, the transponder determines if multiple antennas are available. If there are multiple antennas available, then, at block 718, the transponder determines which antenna is coupled to the strongest channel. In an embodiment, the transponder determines which channel is the strongest by adding loads to the different channels and comparing measurements of amplitudes to pick the channel with the highest amplitude. In another embodiment, the strongest channel can be determined by measuring current or voltage in the antennas directly as well as other envisioned methods of determining channel strength. At block 720, the transponder configures response data (in accordance with the manner indicated at block 712) and, at block 722, the transponder transmits the response data back to the base station using active transmission. In an embodiment, if there are multiple antennas, the transponder uses the antenna with the strongest channel to transmit the response data. Thus, depending on the transmission mode of the base station, the transponder can select a transmission mode accordingly, which allows the same transponder to interface with both an immobilizer system and service equipment using load modulation and an immobilizer using active transmission.

The transponder 604 described herein offer advantages because the transponder 604 is able to communicate with old legacy base stations as well new type C&T base stations. Since base stations are installed in automobiles, garages, etc., having the transponder 604 doesn't require changing old infrastructure that could be costly. Further, it is no longer necessary to keep producing transponders for old legacy system because the transponder 604 is capable of communicating with these older legacy system.

The base station 102 ends its command communication with the transponder 604 with a stop condition. The stop condition is typically longer in duration that a "0" or a "1" bit. A legacy load modulation transponder will end listening to the communication from the base station 102 after the stop condition is received. In one embodiment, the legacy transponder disables its demodulator when the stop condition is received and prepare for sending a response back to the base station 102, typically after 200 $T^o$ ($T^o$=carrier cycle) later.

Figure 8:
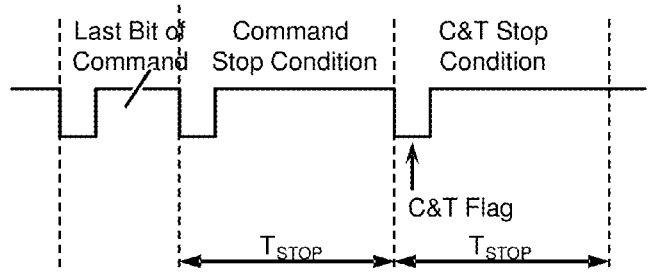
FIG. 8 illustrates charge & talk bit after a command stop condition sent from the base station in accordance with an embodiment.

If the base station 102 is capable of receiving Charge & Talk (C&T) responses, the base station 102 will indicate this capability by sending at least one more bit (shows as C&T Flag in FIG. 8) after the first stop condition. This extra stop condition is an indication to the transponder 604 that the base station 102 is capable of receiving C&T protocol responses. If the transponder 604 does not receive another pulse after the command stop condition pulse, the transponder 604 prepares to respond with load modulation, else the transponder 604 continues to listen for optional bits.

In some embodiments, extra bits that are sent after the command stop condition pulse can be used to encode configuration data for the C&T communication. Typically, the optional bits are limited to a short time-frame that is allowed for the transponder 604 response delay. The base station 102 does not send more bits because otherwise the base station 102 would not be able to listen to a possible answer from a load modulation transponder.

Figure 9:
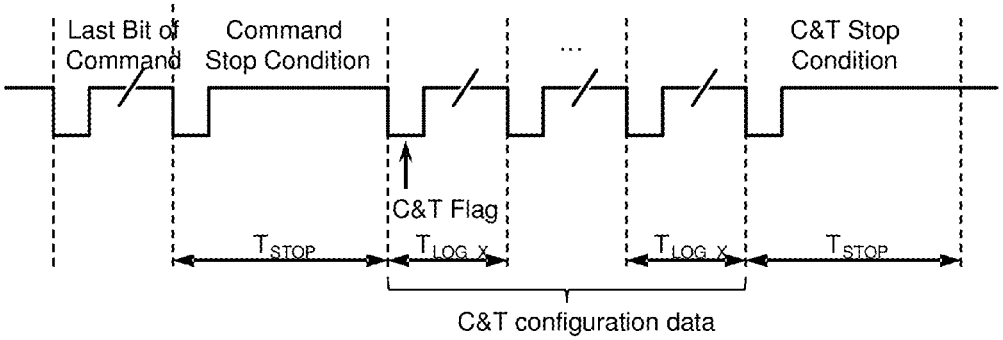
FIG. 9 illustrates configuration data sent from a base station in accordance with an embodiment.

As shows in FIG. 9, in some embodiments, the base station 102 may send configuration data to the transponder 604. Typically, the configuration data may include charging time. The charging time may be represented as a multiple of timescale (with or without offset). The configuration data representing charging time may also be a lookup table pointer. The look up table includes different preconfigured charging times.

The configuration data may also include signal level configuration for the response from the transponder 604. In some other embodiments, the base station 102 may also send a configuration flag "C&T enforced". In some embodiments, the configuration data may also include data to indicate which digital modulation to be used for the communication with the base station 102.

Figure 10:
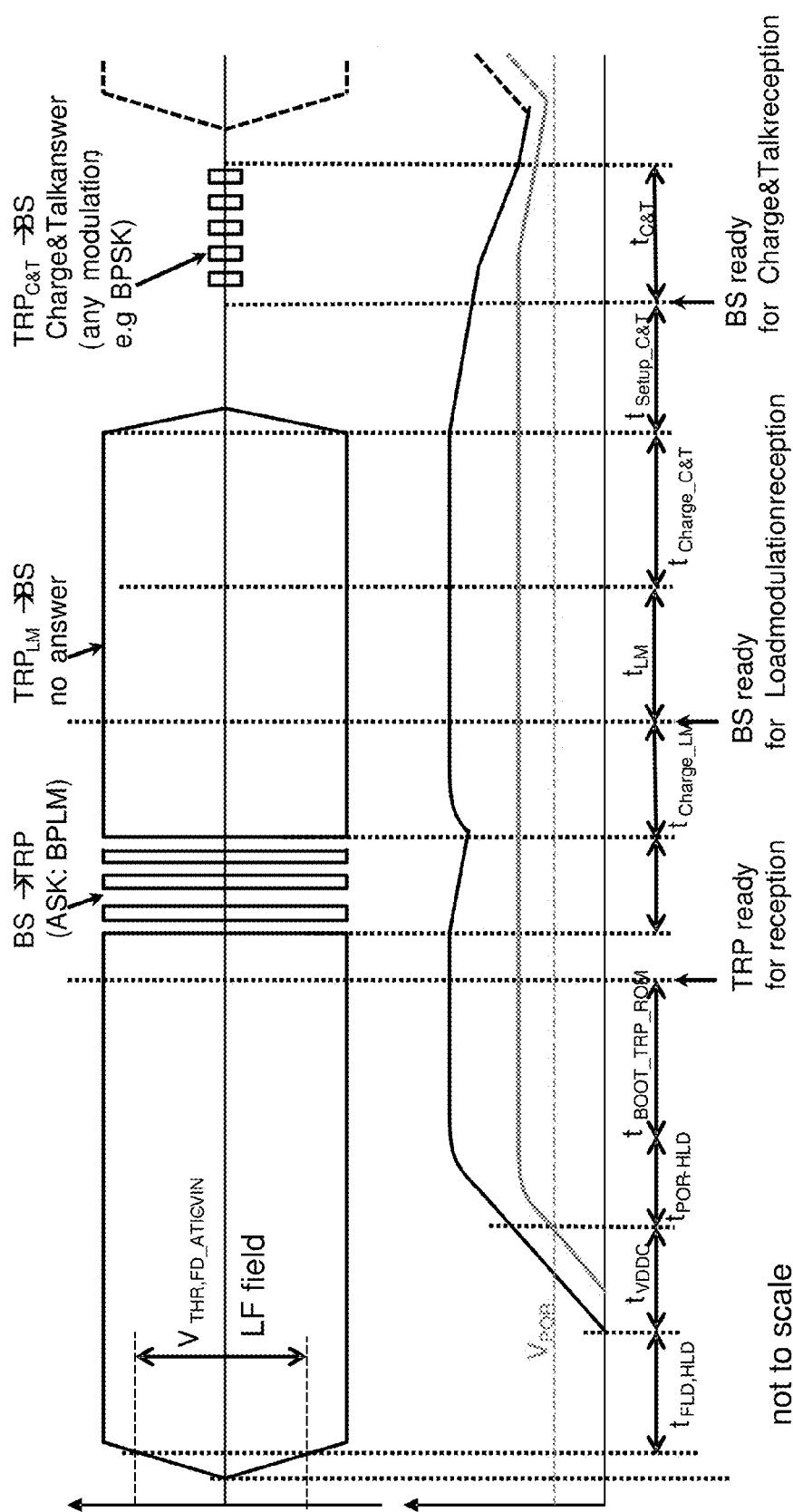
FIG. 10 illustrates differentiation between load modulation and C&T response by time multiplex in accordance with an embodiment.

FIG. 10 illustrates differentiation between load modulation and C&T response by time multiplex. Accordingly, the base station 102 provides field to startup/boot the transponder 604. After the time marked "TRP Ready for Reception", The base station 102 sends data/command to the transponder 604. The base station 102 continues to provide the field to power the transponder 604 and switches into load modulation receive mode while continuing to provide the field. If a valid load modulation signal from the transponder 604 is detected, communication may be ended after receiving the load modulation signal. Otherwise, the base station 102 continues to provide the field to charge the transponder 604. After no load modulation signal is detected, the base station 102 turns off the field and switches into the listening mode for the transponder 604 in C&T mode. The transponder 604 communicates actively back to the base station 102. In some embodiments the response from the transponder 604 may be splitted into parts. Response parts which follow the first response part can be initiated by another short command by the base station 102.

While the backward link for load modulation is essentially limited to modulation of the amplitude, due to detuning of the resonant circuit, it can also result in phase modulation at the base station 102. On the other hand, the transponder 604 in C&T mode may employ other types of modulations, e.g., ASK (Amplitude Shift Keying), PSK (Phase Shift Keying), FSK (Frequency Shift Keying) or BPSK (Binary Phase Shift Keying), etc. that are less prone to distortion.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An integrated circuit (IC) device comprising:
a load modulation module;
a current source coupled to the load modulation module;
a first pin to connect to a resonant circuit, the first pin coupled to the load modulation module and to the current source; and
a second pin to a charge source, the second pin coupled to the current source;
wherein the IC device is configured to monitor input communication for a stop command signal and a bit and if the stop command signal is received but the bit is not received within a predetermined time interval after receiving the stop command signal, the load modulation module is activated to provide a signal for transmission by modifying a carrier of the input communication through the load modulation module; and
wherein if the bit is received within the predetermined time interval after receiving the stop command signal, the current source is activated to provide a signal for transmission by generating pulses of current.

2. The IC device of claim 1, wherein prior to activating the current source to provide a signal for transmission, the IC device is configured to wait for the bit in the input communication.

3. The IC device of claim 2, wherein the IC is configured to receive charge & talk configuration data after receiving the bit.

4. The IC device of claim 1, wherein the IC device further comprises a command interpreter configured to interpret a received initialization command, enable the current source and disable the load modulation, and disable the current source and enable the load modulation module according to a mode indicated by the initialization command.

5. A transponder, the transponder comprising:
a resonant circuit serving as an antenna;
a load modulation module coupled to the resonant circuit; and
a current source coupled to the resonant circuit;
a command interpreter configured to interpret a received initialization command, wherein the command interpreter is configured to monitor input communication for a stop command signal and a charge & talk bit and if the stop command signal is received but the charge & talk bit is not received within a predetermined time interval after receiving the stop command signal, the load modulation module is activated to provide a signal for transmission by modifying a carrier wave of an incoming signal through the load modulation module, and if the charge & talk bit is received within a predetermined time interval after receiving the stop command signal, the current source is activated to provide a signal for transmission by generating pulses of current.

6. The transponder of claim 5, wherein the transponder comprises a plurality of antennas.

7. The transponder of claim 6, wherein the plurality of antennas are arranged in an orthogonal pattern, wherein an antenna with strongest signal is used for transmission.

8. The transponder of claim 5, wherein prior to activating the current source to provide a signal for transmission, the command interpreter is configured to wait for the charge & talk bit in the input communication.

9. The transponder of claim 8, further configured to receive charge & talk configuration data after receiving the charge & talk bit.

10. The transponder of claim 9, further configured to configure the resonance circuit according to the charge & talk configuration data.

11. The transponder of claim 5, wherein the command interpreter is implemented with a microcontroller, the microcontroller including a demodulator configured to receive a serial bitstream and convert the bitstream into at least one of a byte or a word.

12. A method for communicating with a base station, the method comprising:

receiving a command stop bit from the base station;

waiting for a predefined period of time for a signal bit after receiving the command stop bit; and wherein if the signal bit is not received within the predefined time, preparing to respond in a load modulation mode and if the signal bit is received, preparing to respond in a charge & talk mode.

13. The method of claim 12, wherein prior to preparing to respond in the charge & talk mode, receiving charge & talk configuration data from the base station.

14. The method of claim 13, wherein the charge & talk configuration data includes a charging time for a capacitor that needs to be charged for a duration equal to the received charging time in order to provide energy for the charge & talk mode.

15. The method of claim 13, wherein the charge & talk configuration data includes a signal level for sending a response to the base station.

16. The method of claim 13, wherein the charge & talk configuration data includes a bit to enforce the charge & talk mode.

17. The method of claim 13, wherein the charge & talk configuration data includes a type of digital modulation to be used to communicate with the base station.

* * * * *